United States Patent
Yamazaki et al.

(10) Patent No.: US 12,148,173 B2
(45) Date of Patent: Nov. 19, 2024

(54) OBJECT TRACKING APPARATUS, CONTROL METHOD, AND PROGRAM

(71) Applicant: NEC Corporation, Tokyo (JP)

(72) Inventors: Daiki Yamazaki, Tokyo (JP); Satoshi Terasawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 403 days.

(21) Appl. No.: 17/439,922

(22) PCT Filed: Mar. 27, 2019

(86) PCT No.: PCT/JP2019/013240
§ 371 (c)(1),
(2) Date: Sep. 16, 2021

(87) PCT Pub. No.: WO2020/194584
PCT Pub. Date: Oct. 1, 2020

(65) Prior Publication Data
US 2022/0189038 A1 Jun. 16, 2022

(51) Int. Cl.
G06T 7/246 (2017.01)

(52) U.S. Cl.
CPC .... *G06T 7/246* (2017.01); *G06T 2207/10016* (2013.01); *G06T 2207/30196* (2013.01)

(58) Field of Classification Search
None
See application file for complete search history.

(56) References Cited

U.S. PATENT DOCUMENTS

| | | | | |
|---|---|---|---|---|
| 6,570,608 | B1 * | 5/2003 | Tserng | G06V 40/20 348/700 |
| 10,074,039 | B2 * | 9/2018 | Mitsumoto | G06F 18/24 |
| 10,282,720 | B1 * | 5/2019 | Buibas | G06Q 20/40 |
| 2008/0101652 | A1 * | 5/2008 | Zhao | G06T 7/292 382/103 |
| 2008/0166045 | A1 * | 7/2008 | Xu | G06T 7/277 382/170 |
| 2014/0205141 | A1 * | 7/2014 | Gao | G06T 7/20 382/103 |
| 2016/0188980 | A1 | 6/2016 | Martin | |
| 2017/0357855 | A1 | 12/2017 | Kusumoto | |

(Continued)

FOREIGN PATENT DOCUMENTS

| | | |
|---|---|---|
| GB | 2558841 A | 7/2018 |
| JP | 2007-134948 A | 5/2007 |

(Continued)

OTHER PUBLICATIONS

Wang, Xinchao, et al. "Tracking interacting objects using intertwined flows." IEEE transactions on pattern analysis and machine intelligence 38.11 (2015): 2312-2326. (Year: 2015).*

(Continued)

*Primary Examiner* — Michelle M Entezari Hausmann

(57) ABSTRACT

An object tracking apparatus (2000) detects an object from video data (12) and performs tracking processing of the detected object. The object tracking apparatus (2000) detects that a predetermined condition is satisfied for a first object (20) and a second object (30), using the video data (12). Thereafter, the object tracking apparatus (2000) performs tracking processing of the second object (30) in association with the first object (20).

8 Claims, 11 Drawing Sheets

(56) References Cited

U.S. PATENT DOCUMENTS

| | | | |
|---|---|---|---|
| 2018/0374233 A1* | 12/2018 | Zhou | G06F 18/22 |
| 2019/0050629 A1* | 2/2019 | Olgiati | G06T 7/20 |
| 2019/0228358 A1* | 7/2019 | Ootsuka | G06Q 10/06315 |
| 2019/0259165 A1 | 8/2019 | Watanabe et al. | |
| 2021/0197861 A1* | 7/2021 | Galoogahi | G06T 7/50 |
| 2022/0366572 A1* | 11/2022 | Ding | G06T 7/246 |
| 2024/0179399 A1* | 5/2024 | Youn | H04N 23/635 |

FOREIGN PATENT DOCUMENTS

| | | | |
|---|---|---|---|
| JP | 2015-114917 A | 6/2015 | |
| JP | 2017-117349 A | 6/2017 | |
| JP | 2017-220151 A | 12/2017 | |
| JP | 2018-508135 A | 3/2018 | |
| WO | 2016/109741 A1 | 7/2016 | |
| WO | 2020/194584 A1 | 10/2020 | |

OTHER PUBLICATIONS

Harritaoglu I, Harwood DA, Davis LS. W4: Real-time surveillance of people and their activities. IEEE Transactions on Pattern Analysis and Machine Intelligence. Aug. 2000;8(22):809-30. (Year: 2000).*

Ivanov, Yuri A., and Aaron F. Bobick. "Recognition of multi-agent interaction in video surveillance." Proceedings of the seventh IEEE international conference on computer vision. vol. 1. IEEE, 1999. (Year: 1999).*

JP Office Action for JP Application No. 2022-185479, mailed on Oct. 10, 2023 with English Translation.

International Search Report for PCT Application No. PCT/JP2019/013240 mailed on Jun. 11, 2019.

JP Official Communication for JP Application No. 2022-185479, mailed on Feb. 20, 2024 with English Translation.

AR Office Action for Argentine Patent Application No. 20200100874, mailed on Nov. 1, 2023 with English Translation.

\* cited by examiner

FIG. 7

| OBJECT IDENTIFIER 202 | DETECTION TIME 204 | CAMERA IDENTIFIER 206 | POSITION 208 | FIRST OBJECT FLAG 210 | ASSOCIATED OBJECT IDENTIFIER 212 |
|---|---|---|---|---|---|
| 0001 | t1 | c01 | (x11, y11) | 1 | - |
| 0001 | t2 | c01 | (x12, y12) | 1 | - |
| 0001 | t3 | c01 | (x13, y13) | 1 | - |
| ... | ... | ... | ... | ... | ... |
| 0002 | t1 | c02 | (x21, y21) | 0 | 0001 |
| 0002 | t2 | c02 | (x22, y22) | 0 | 0001 |
| 0002 | t3 | c02 | (x23, y23) | 0 | 0001 |
| ... | ... | ... | ... | ... | ... |

200

PERSON SURROUNDED BY CIRCUMSCRIBED
RECTANGLE 92-2 IS HANDLED AS FIRST OBJECT 20

OBJECT TRACKING APPARATUS, CONTROL METHOD, AND PROGRAM

This application is a National Stage Entry of PCT/JP2019/013240 filed on Mar. 27, 2019, the contents of all of which are incorporated herein by reference, in their entirety.

TECHNICAL FIELD

The present invention relates to a technique for tracking an object using a video.

BACKGROUND ART

A system that performs tracking of a person and an object using video data obtained from a camera has been developed. For example, Patent Document 1 discloses a system that monitors a person by mapping the same person among images captured by a plurality of cameras.

RELATED DOCUMENT

Patent Document

[Patent Document 1] Japanese Patent Application Publication No. 2015-114917

SUMMARY OF THE INVENTION

Technical Problem

The present inventor has found that, when tracking a certain object using video data, tracking of another object may be required. Patent Document 1 does not mention such a problem.

The present invention has been made in view of the above-described problem, and an objective of the present invention is to provide a technique capable of performing tracking of an object using video data in a more flexible manner.

Solution to Problem

An object tracking apparatus according to the present invention includes: 1) a tracking processing unit that performs tracking processing of an object detected from video data; and 2) a detection unit that detects, using the video data, that a predetermined condition is satisfied for a first object and another second object, of each of which tracking processing is performed by the tracking processing unit. The tracking processing unit performs tracking processing of the second object in association with the first object when it is detected that the predetermined condition is satisfied.

A control method according to the present invention is executed by a computer. The control method includes: 1) a tracking processing step of performing tracking processing of an object detected from video data; and 2) a detection step of detecting, using the video data, that a predetermined condition is satisfied for a first object and another second object, of each of which tracking processing is performed by the tracking processing step. In the tracking processing step, tracking processing of the second object is performed in association with the first object when it is detected that the predetermined condition is satisfied.

A program according to the present invention causes a computer to execute each step of the control method according to the present invention.

Advantageous Effects of Invention

According to the present invention, there is provided a technique capable of performing tracking of an object using video data in a more flexible manner.

BRIEF DESCRIPTION OF THE DRAWINGS

The above-described object and other objects, features, and advantages will be further clarified by the preferred embodiments to be described below and the following drawings attached thereto.

FIG. 7 is a diagram illustrating tracking information in a table format.

DESCRIPTION OF EMBODIMENTS

Figure 1:
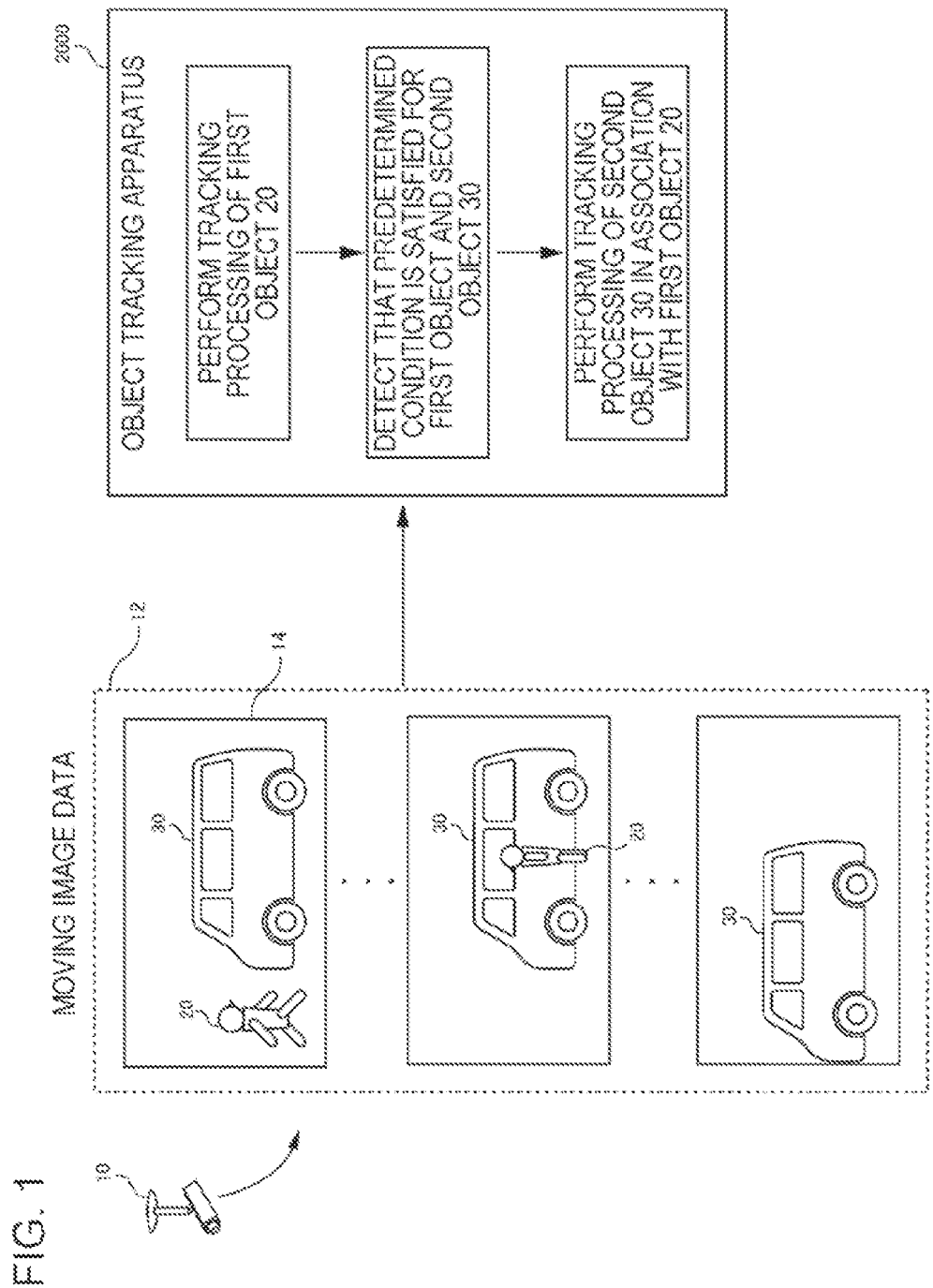
FIG. 1 is a diagram illustrating an outline of an operation of an object tracking apparatus according to the present example embodiment.

Hereinafter, embodiments of the present invention will be described with reference to the drawings. In all the drawings, the same reference numerals are given to the same components, and the description will not be repeated as appropriate. Further, unless otherwise specified, in each block diagram, each block represents a functional unit configuration, not a hardware unit configuration.

Outline

FIG. 1 is a diagram illustrating an outline of an operation of an object tracking apparatus 2000 according to the present example embodiment. FIG. 1 is a diagram illustrating a conceptual description for facilitating understanding of the operation of the object tracking apparatus 2000, and does not specifically limit the operation of the object tracking apparatus 2000.

The object tracking apparatus 2000 is an apparatus that performs object tracking processing using video data 12 obtained from each of one or more cameras 10. For example, the camera 10 is a surveillance camera which is provided in various places such as a road or a station. Note that the "object tracking processing" means processing of continuously determining a position of an object from the video data 12 (from a time-series of video frames 14 of the video data 12).

The "continuous determining of the position of the object" is not limited to a case of continuously determining the position of the object at a constant frequency. For example, in a case where tracking of an object is performed in a wide range using a plurality of cameras 10 each of which has a different imaging range, it takes time until the object gets out of an imaging range of certain camera and falls within an imaging range of another camera. Even in such a case, for example, when the object gets out of an imaging range of a certain camera 10, based on the positional relationship between the cameras 10 or the like, the object tracking apparatus 2000 attempts to detect the object on the video data 12 obtained from another camera 10 around the camera 10. Thereby, the position of the object can be determined again. In this way, continuous determining of the position of the object can be performed (that is, object tracking processing can be realized).

The object tracking apparatus 2000 detects an object from the video data 12 and performs tracking processing of the detected object. Here, it is assumed that a first object 20 is already tracked by the object tracking apparatus 2000. In the example of FIG. 1, the first object 20 is a person. Note that it is not always necessary to perform tracking processing for all objects detected from the video data 12.

The object tracking apparatus 2000 detects that a predetermined condition is satisfied for the first object 20 and a second object 30, using the video data 12. The second object 30 is an object other than the first object 20. The predetermined condition is a condition that is satisfied in a case where the first object 20 enters into the second object 30 or in a case where the first object 20 rides on the second object 30. In these cases, although it becomes difficult to directly track the first object 20 using the video data 12, it is possible to indirectly track the first object 20 by tracking the second object 30.

For example, it is assumed that the first object 20 is a person A and the second object 30 is a car X. Further, it is assumed that the person A enters into the car X (ride in the car X) and starts to move in the car X. In this situation, since the person A is no longer detected from the video data 12, it is difficult to directly track the person A. On the other hand, since the person A enters into the car X and moves in the car X, it is possible to indirectly track the person A by tracking the car X.

In addition, for example, it is assumed that the first object 20 is a person A and the second object 30 is a motorcycle Y. It is also assumed that the person A rides on the motorcycle Y and starts to move on the motorcycle Y. Here, even in a case of a vehicle on which a person rides without entering into the vehicle, such as a motorcycle, the person may be no longer detected from the image as a result that the person rides on the vehicle. Even in such a case, it is difficult to directly track the person A. On the other hand, as in the example of the car X, it is possible to indirectly track the person A by tracking the motorcycle Y.

When it is determined that the predetermined condition is satisfied, the object tracking apparatus 2000 performs tracking processing of the second object 30 in association with the first object 20. For example, in a case where a person, who is being tracked as the first object 20, rides in a car and starts to move in the car, tracking processing of the car is performed in association with that person. Therefore, tracking of the person can be substantially continued by tracking the car.

Representative Advantageous Effect

When the object which is being tracked enters into another object and starts to move in the another object, such a case where the person who is being tracked rides in a car and starts to move in the car, it is difficult to directly and continuously track the object which is being tracked. The same applies to a case where a person may be no longer detected from the video data as a result that the person rides on a motorcycle or the like and starts to move on the motorcycle or the like.

The object tracking apparatus 2000 according to the present example embodiment performs tracking of the second object 30 in association with the first object 20 in a case where it becomes difficult to directly and continuously track the first object 20. In this way, object tracking is realized in a more flexible manner. Specifically, even in a situation where it is difficult to directly detect the first object 20 from the video data 12, tracking of the first object 20 can be substantially continued.

Hereinafter, the object tracking apparatus 2000 according to the present example embodiment will be described in more detail.

Example of Functional Configuration of Object Tracking Apparatus 2000

Figure 2:
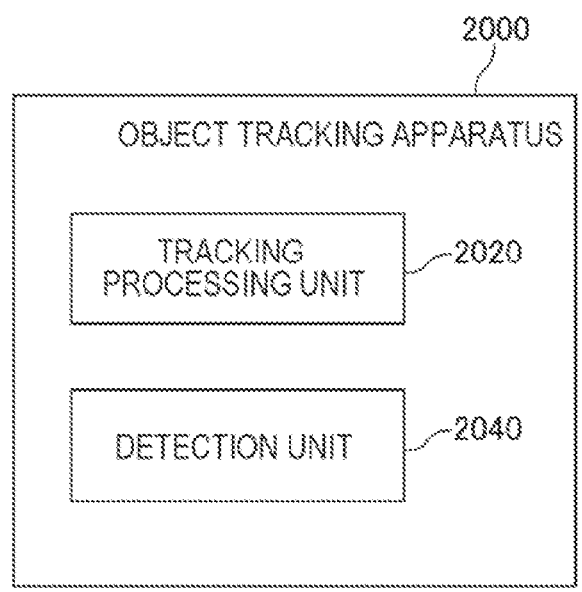
FIG. 2 is a diagram illustrating a configuration of the object tracking apparatus according to an example embodiment 1.

FIG. 2 is a diagram illustrating a configuration of the object tracking apparatus 2000 according to an example embodiment 1. The object tracking apparatus 2000 includes a tracking processing unit 2020 and a detection unit 2040. The tracking processing unit 2020 performs tracking processing of an object detected from the video data 12. The detection unit 2040 detects that a predetermined condition is satisfied for the first object 20 and the second object 30, using the video data 12. The predetermined condition is satisfied in a case where the first object 20 enters into the second object 30 or in a case where the first object 20 rides on the second object 30. When it is detected that the predetermined condition is satisfied, the tracking processing unit 2020 performs tracking processing of the second object 30 in association with the first object 20.

Hardware Configuration of Object Tracking Apparatus 2000

Each functional unit of the object tracking apparatus 2000 may be realized by hardware (for example, a hard-wired electronic circuit) that realizes each functional unit, or a combination of hardware and software (for example, a combination of an electronic circuit and a program for controlling the electronic circuit). Hereinafter, a case where each functional unit of the object tracking apparatus 2000 is realized by a combination of hardware and software will be described.

Figure 3:
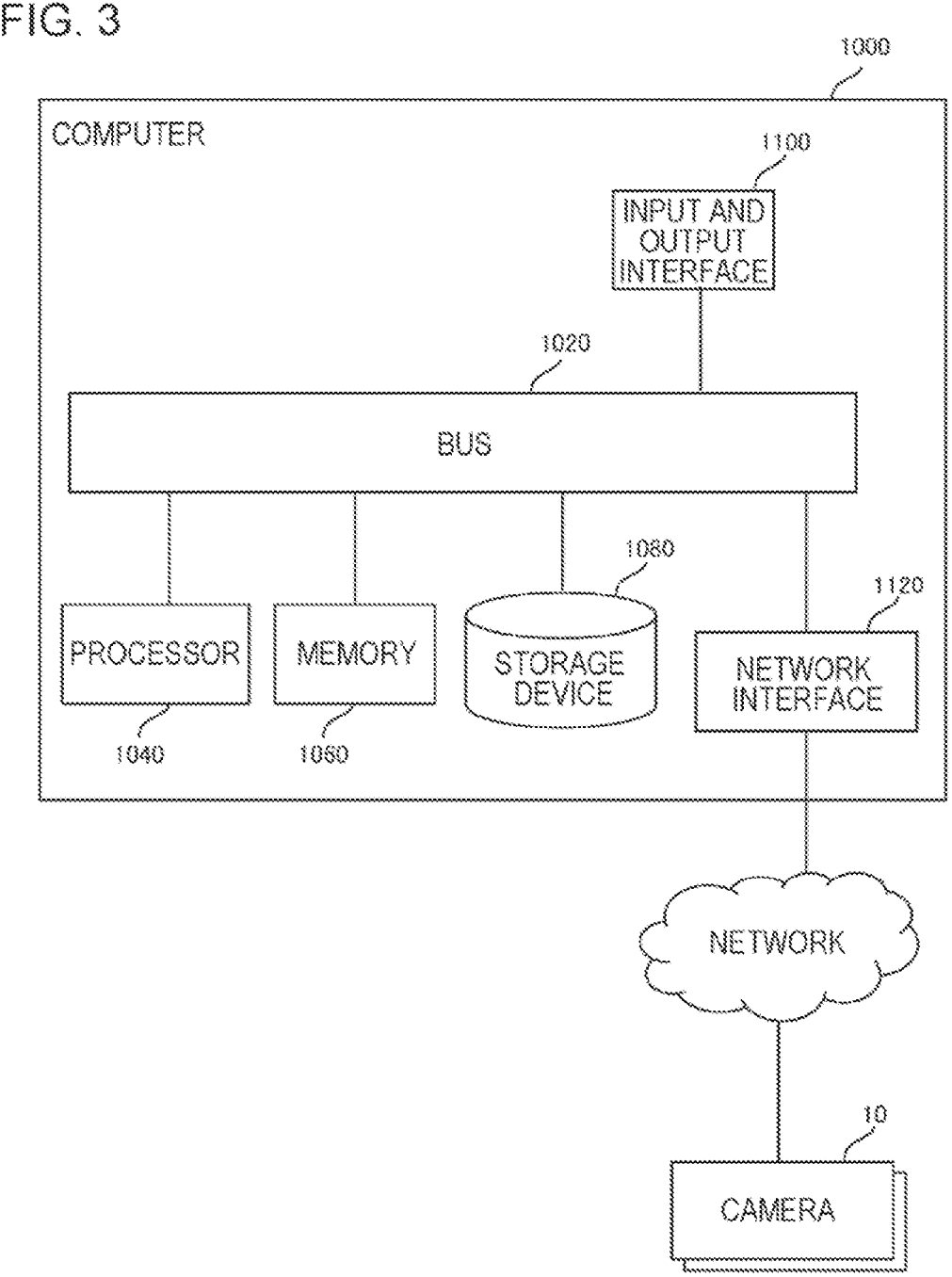
FIG. 3 is a diagram illustrating a computer for realizing the object tracking apparatus.

FIG. 3 is a diagram illustrating a computer 1000 for realizing the object tracking apparatus 2000. The computer 1000 is a certain computer. For example, the computer 1000 is a personal computer (PC), a server machine, a tablet terminal, or a smartphone. The computer 1000 may be a dedicated computer designed for realizing the object tracking apparatus 2000, or a general-purpose computer.

The computer 1000 includes a bus 1020, a processor 1040, a memory 1060, a storage device 1080, an input and output interface 1100, and a network interface 1120. The bus 1020 is a data transmission path through which the processor 1040, the memory 1060, the storage device 1080, the input and output interface 1100, and the network interface 1120 transmit and receive data to and from each other. Here, a method of connecting the processor 1040 and the like to each other is not limited to bus connection. The processor 1040 is a processor such as a central processing unit (CPU), a graphics processing unit (GPU), or a field-programmable gate array (FPGA). The memory 1060 is a main storage device that is realized using a random access memory (RAM) or the like. The storage device 1080 is an auxiliary storage device that is realized using a hard disk drive, a solid state drive (SSD), a memory card, a read only memory (ROM), or the like. Here, the storage device 1080 may be configured by hardware similar to the hardware of the main storage device such as RAM.

The input and output interface 1100 is an interface for connecting the computer 1000 and an input and output device. The network interface 1120 is an interface for connecting the computer 1000 to a communication network. The communication network is, for example, a local area network (LAN) or a wide area network (WAN). A method of connecting the network interface 1120 to the communication network may be wireless connection or a wired connection.

The storage device 1080 stores a program module that realizes the functional unit of the object tracking apparatus 2000. The processor 1040 realizes a function corresponding to each program module by reading each program module into the memory 1060 and executing the program module.

Use Example

The object tracking apparatus 2000 can be used in various scenes. Here, a specific example of a use scene of the object tracking apparatus 2000 will be described.

Figure 4:
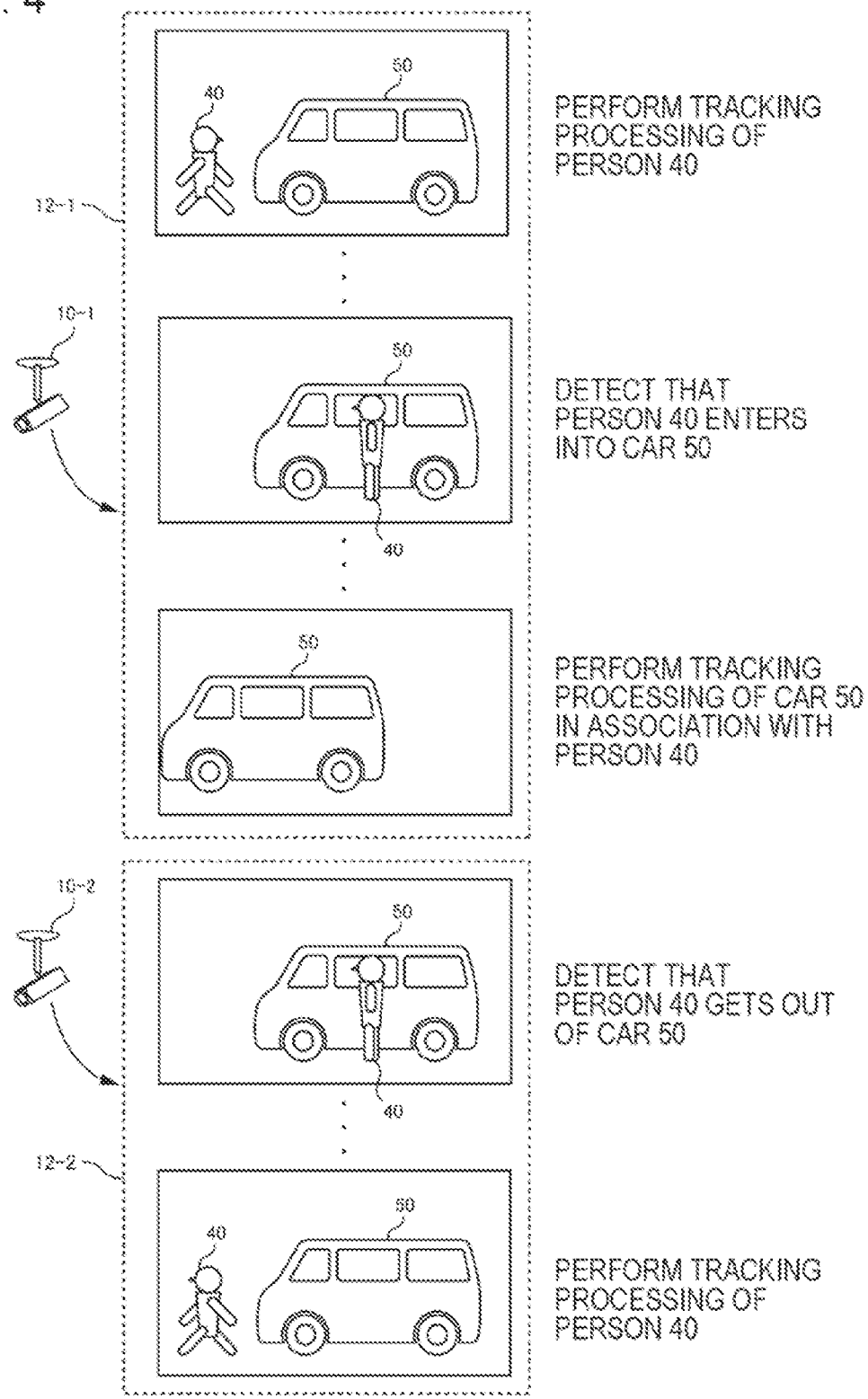
FIG. 4 is a diagram illustrating an example of a use scene of the object tracking apparatus.

FIG. 4 is a diagram illustrating an example of a use scene of the object tracking apparatus 2000. In FIG. 4, in a case where a certain person moves by using a vehicle, the object tracking apparatus 2000 is used to continuously track the person. In the following, a case where a person rides in a vehicle and moves in the vehicle will be described. However, a case where a person rides on a vehicle and moves on the vehicle may be handled in the same manner as in the example to be described.

First, it is assumed that the object tracking apparatus 2000 performs tracking processing of a person 40 who is moving on foot as the first object 20. Thereafter, the person 40 rides in a car 50. At this time, the object tracking apparatus 2000 detects that the person 40 enters into the car 50 (the person 40 rides in the car 50), as a detection of that the predetermined condition is satisfied. The object tracking apparatus 2000 associates the person 40 with the car 50 and performs tracking processing of the car 50.

Thereafter, the person 40 gets off the car 50. At this time, the object tracking apparatus 2000 detects that the person 40 is separated from the car 50, and restarts tracking of the person 40. Here, in a case where the first object 20 enters into the second object 30, "detecting that the first object 20 is separated from the second object 30" may also be expressed as "detecting that the first object 20 gets out of the second object 30". Further, in a case where a person enters into a vehicle and moves in the vehicle, it may be more specifically expressed as "detecting that the person 40 gets off the car 50".

As described above, according to the object tracking apparatus 2000, even in a case where a person to be tracked is temporarily no longer detected from the video data 12 because the person uses a vehicle, tracking processing of the person can be continued.

Note that, by repeatedly performing the same processing, even when the person 40 moves while transferring between vehicles, tracking of the person 40 can be continued. For example, in FIG. 4, it is assumed that the person 40 gets off the car 50, moves by walking, and then rides in a train. In this case, the object tracking apparatus 2000 detects that the person 40 enters into a train (the person 40 rides in a train) (detects that the predetermined condition is satisfied). The object tracking apparatus 2000 associates the person 40 with the train, and performs tracking processing of the train. Thereafter, the object tracking apparatus 2000 detects that the person 40 gets off the train, and restarts tracking processing of the person 40.

Note that, in a case of tracking a vehicle whose service schedule is known in advance, such as a train or a bus, the tracking processing may be performed by further using information such as the service schedule. For example, it is assumed that the person 40 rides in a certain train. At this time, each station at which the train stops can be determined based on a station at which the person 40 rides in the train, a time when the person 40 rides in the train, a number of the platform on which the person 40 rides in the train, and the like. Therefore, the object tracking apparatus 2000 can detect that the person 40 gets off the train by attempting to detect the person 40 from the video data 12 obtained from the camera 10 provided at each station at which the train stops. Note that, as a technique of acquiring a service schedule of a train or a bus, the existing technique may be used.

Note that an arrival time of a train is pre-determined for every station. Therefore, the object tracking apparatus 2000 may determine, for each station, a time when the train on which the person 40 rides stops at the station based on the service schedule, and may attempt to detect the person 40 from the video data 12 obtained from the camera 10 provided at the station during a period from the arrival time or a time earlier than the arrival time by a predetermined time to a time when the train leaves the station. In this way, a length of the video data 12 for detection processing of the person 40 can be reduced, and thus it is possible to reduce a calculation cost of the object tracking apparatus 2000.

Figure 5:
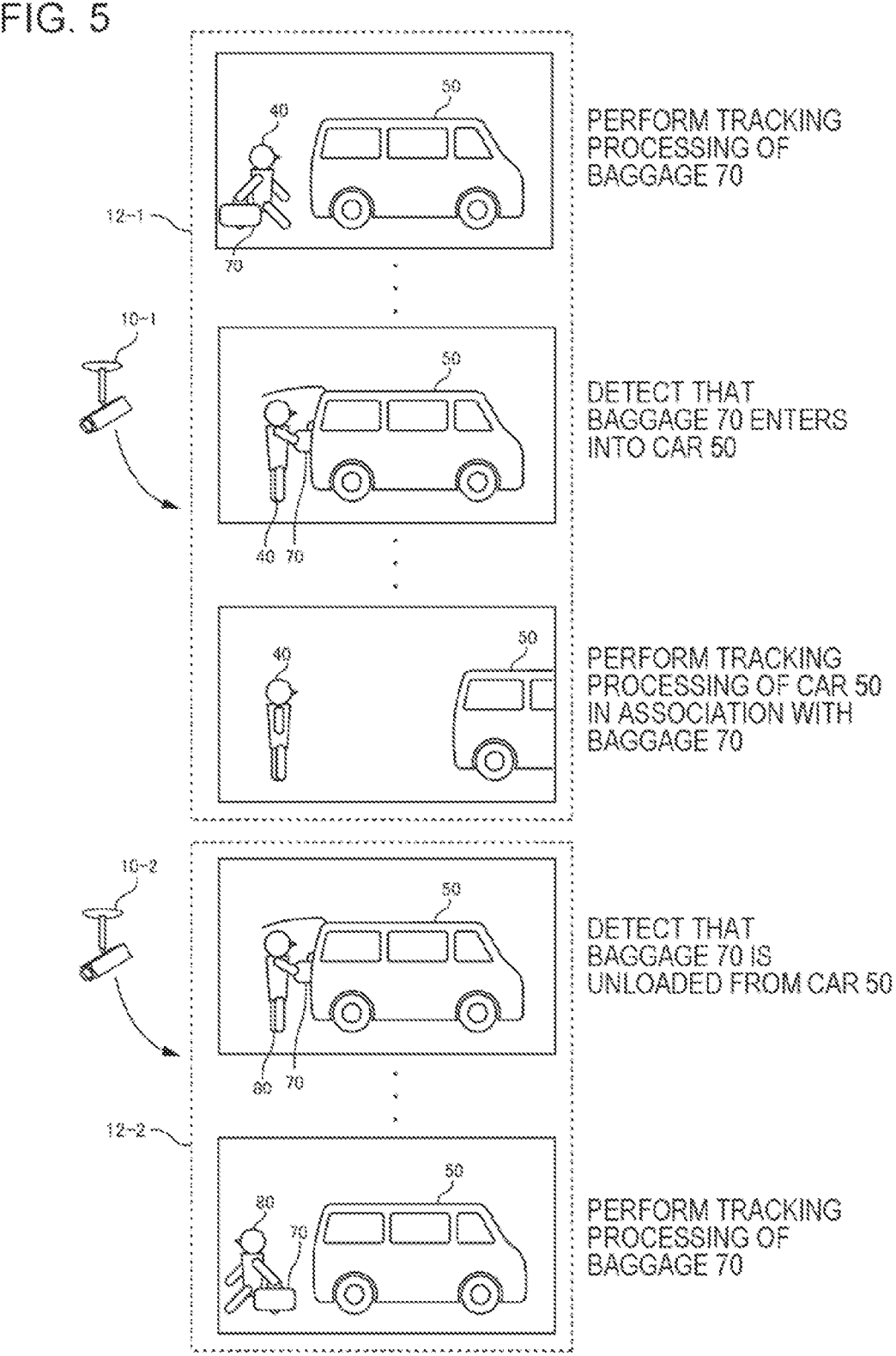
FIG. 5 is a diagram illustrating another example of a use scene of the object tracking apparatus.

The object handled as the first object 20 is not limited to a person. For example, the object tracking apparatus 2000 may be used to continuously track a specific baggage such as a bag. FIG. 5 is a diagram illustrating another example of a use scene of the object tracking apparatus 2000. In FIG. 5, the object tracking apparatus 2000 is used to continuously track baggage in a case where the baggage is carried using a vehicle such as a car or a train.

First, it is assumed that the object tracking apparatus 2000 performs tracking of baggage 70 as the first object 20. Initially, the baggage 70 is carried by the person 40 who is moving by walking, and thus it is possible to directly track the baggage 70 using the video data 12.

Thereafter, the baggage 70 is stored in a trunk of the car 50. That is, the baggage 70 is placed in the car 50. At this time, the object tracking apparatus 2000 detects that the baggage 70 enters into the car 50 (the baggage 70 is placed in the car 50) so as to detect that the predetermined condition is satisfied. Therefore, the object tracking apparatus 2000 associates the baggage 70 with the car 50 and performs tracking of the car 50.

Thereafter, the baggage 70 is unloaded from the car 50. At this time, the object tracking apparatus 2000 detects that the baggage 70 is separated from the car 50 (the baggage 70 is unloaded from the car 50). The object tracking apparatus 2000 restarts tracking processing of the baggage 70.

Here, the baggage 70 unloaded from the car 50 is carried by the person 80. While being carried by the person 80, the baggage 70 is included in the video data 12. Therefore, the object tracking apparatus 2000 can directly track the baggage 70.

As described above, according to the object tracking apparatus 2000, even in a case where the baggage is temporarily no longer detected from the video data 12 because the baggage is carried using a vehicle such as a train, tracking processing of the baggage can be continued.

Note that, by repeatedly performing the same processing, even when the baggage 70 is carried by a plurality of vehicles, tracking of the baggage 70 can be continued. For example, in FIG. 5, it is assumed that the person 80 moves by walking and then rides in a train. In this case, the object tracking apparatus 2000 detects that the baggage 70 enters into the train (the baggage 70 is placed in the train). The object tracking apparatus 2000 associates the baggage 70 with the train, and performs tracking processing of the train. Thereafter, the object tracking apparatus 2000 detects that the baggage 70 is unloaded from the train, and restarts tracking processing of the baggage 70.

Note that, even in a case where the baggage 70 is carried by being placed on the vehicle (such as a baggage carrier) instead of being carried in a vehicle, the baggage 70 may be handled in the same manner (case where the first object 20 rides on the second object 30).

Here, in addition to the case where the baggage 70 is carried by being placed on a vehicle, for example, a case where the baggage 70 is carried while concealed in such a manner as being covered with a cloth may be possible. In this case, the cloth or the like covering the baggage 70 is tracked in association with the baggage 70. Here, in this case, since the baggage 70 covered with cloth is carried by a person or a vehicle, the person or the vehicle carrying the baggage 70 may be further tracked in association with the baggage 70.

The second object 30 is not limited to a moving object. For example, it may be considered that a building is handled as the second object 30. Specifically, in a case where a person or an object being tracked as the first object 20 enters into a building, tracking of the building is performed in association with the first object 20. When the first object 20 (person or object) gets out of the building, tracking of the person or the object is performed again. Note that, in the tracking of the building associated with the first object 20, monitoring as to whether or not the first object 20 gets out of the building (that is, determination as to whether or not the first object 20 is separated from the building) may be performed, and a position of the building may not be determined.

Flow of Processing

Figure 6:
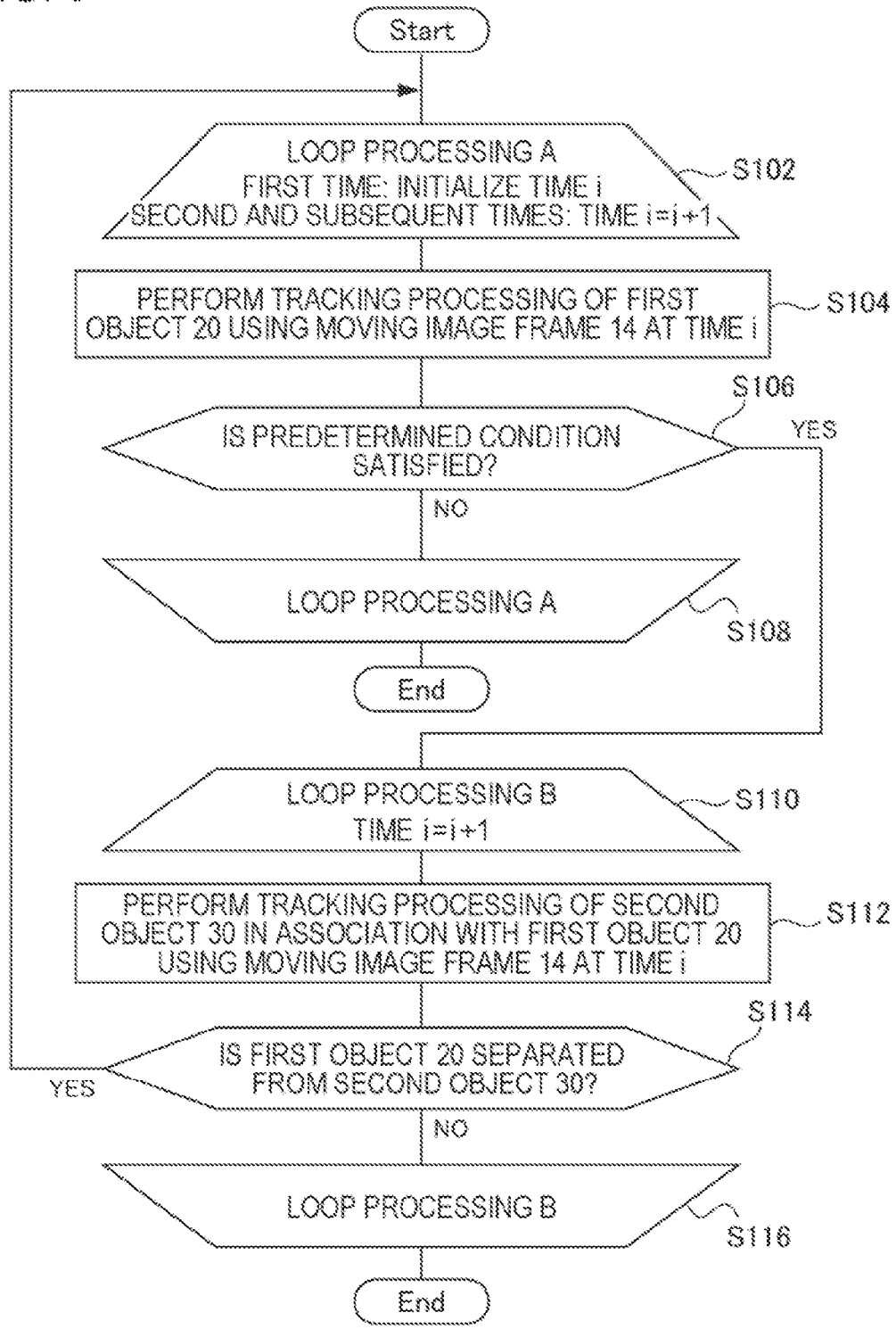
FIG. 6 is a flowchart illustrating a flow of processing executed by the object tracking apparatus according to the example embodiment 1.

FIG. 6 is a flowchart illustrating a flow of processing executed by the object tracking apparatus 2000 according to the example embodiment 1. Steps of S102 to S108 correspond to a loop processing A in which tracking processing of the first object 20 is repeatedly performed. In the first execution of S102, a time i is initialized. For example, at the time of initialization, the time i is set to the current time. In the second and further execution of S102, the time i is increased by one unit (for example, one frame).

The tracking processing unit 2020 performs tracking processing of the first object 20 using each video frame 14 at the time i (S104). The detection unit 2040 determines whether or not a predetermined condition for the first object 20 and the second object 30 is satisfied (S106). Note that the determination as to whether or not the predetermined condition is satisfied is performed using the video frames 14 at and before the time i.

In a case where it is determined that the predetermined condition is not satisfied (NO in S106), the processing of FIG. 6 proceeds to S108. Since S108 is the end of the loop processing A, the processing of FIG. 6 returns to S104.

In a case where it is determined that the predetermined condition is satisfied (YES in S106), the processing of FIG. 6 proceeds to S110. Steps of S110 to S116 correspond to a loop processing B in which tracking processing of the second object 30 is repeatedly performed in association with the first object 20. In S110, the time i is increased by one unit (for example, one frame).

The tracking processing unit 2020 performs tracking processing of the second object 30 associated with the first object 20 using each video frame 14 at the time i (S112). The detection unit 2040 determines whether or not the first object 20 is separated from the second object 30 (S114). Note that the determination as to whether or not the first object 20 is separated from the second object 30 is performed using the video frames 14 at and before the time i.

In a case where it is determined that the first object 20 is not separated from the second object 30 (NO in S114), the processing of FIG. 6 proceeds to S116. Since S116 is the end of the loop processing B, the processing of FIG. 6 returns to S110.

In a case where it is determined that the first object 20 is separated from the second object 30 (YES in S114), the processing of FIG. 6 proceeds to S102. Therefore, tracking processing of the first object 20 is performed again in the loop processing A.

Note that there are various triggers for ending a series of the processing illustrated in FIG. 6. For example, the object tracking apparatus 2000 ends the processing in response to reception of a predetermined user input. In addition, for example, the object tracking apparatus 2000 ends the processing when the video data 12 cannot be acquired from the camera 10. For example, in a case where an administrator of the camera 10 stops an operation of the camera 10, the video data 12 cannot be obtained from the camera 10, and as a result, the object tracking apparatus 2000 ends the processing.

Here, when ending the processing, the object tracking apparatus 2000 may end the processing by exiting any one of pieces of the loop processing as illustrated in FIG. 6, or end the processing in a form of stopping the processing in the middle of the loop processing.

There are also various triggers for starting a series of the processing illustrated in FIG. 6. For example, the object tracking apparatus 2000 starts the processing in response to reception of a predetermined user input. In addition, for example, the object tracking apparatus 2000 starts the processing when the video data 12 is acquired from the camera 10.

Method of Acquiring Video Data 12

The object tracking apparatus 2000 acquires the video data 12 from each of the one or more cameras 10. Here, as a technique of acquiring the video data generated by the camera, an existing technique may be used. For example, the object tracking apparatus 2000 is connected to each camera 10 through a network. Each time the camera 10 generates a new video frame 14, the camera 10 transmits the video frame 14 to the object tracking apparatus 2000. The object tracking apparatus 2000 receives the transmitted video frame 14.

In addition, for example, each camera 10 may store the generated video frame 14 in a storage device which allows access from the object tracking apparatus 2000. In this case, for example, the object tracking apparatus 2000 acquires unacquired video frames 14 by periodically accessing the storage device.

Here, the tracking of the object by the object tracking apparatus 2000 is not necessarily performed in real time. In a case where tracking is not performed in real time, the object tracking apparatus 2000 acquires a set of video frames 14 (that is, the video data 12) stored in the storage device, and performs tracking of the object using the acquired video frames 14.

At this time, the object tracking apparatus 2000 may perform tracking of the object using all the pieces of the video data 12, or may perform tracking of the object using some of the pieces of the video data 12. In the latter case, for example, the object tracking apparatus 2000 determines the video data 12 to be used for tracking of the object based on an input operation by a user. For example, the object tracking apparatus 2000 receives an input for specifying a period and a region from the user. In a case where a period is specified, the object tracking apparatus 2000 acquires the video data 12 generated during the specified period, and performs tracking processing of the object using the video data 12. In a case where a region is specified, the object tracking apparatus 2000 acquires the video data 12 generated by each camera 10 provided in the specified region, and performs tracking processing of the object using the video data 12. Note that the camera 10 provided in the specified region can be determined by using information that is prepared to indicate a place at which each camera 10 is provided.

Detection of Object

In order to perform tracking processing of the object, the tracking processing unit 2020 performs processing of detecting the object from each video frame 14 of the video data 12. For example, the tracking processing unit 2020 detects an image region which is not included in the background region (so-called foreground region) from the video data 12, and detects the detected foreground region as an object. The tracking processing unit 2020 generates information indicating a combination of "an identifier of the video data 12, a position of the object, and a feature value of the object" for the detected object. Hereinafter, information related to the detected object is referred to as detection information. The detection information may include a detection time of the object (a generation time of the video data 12) together with or instead of the identifier of the video data 12. Note that, as a specific technique of detecting an object from a video frame (that is, an image), an existing technique may be used.

Here, the position of the object that is indicated by the detection information may be represented by a coordinate in a coordinate space of each camera 10 (relative coordinate), or may be represented by a coordinate in a coordinate space common to all the cameras 10 (absolute coordinate). In the former case, when the imaging range of the camera 10 is fixed, the position of the object may be represented by a coordinate of the object on the video frame 14. On the other hand, in a case where the imaging range of the camera 10 is not fixed (for example, in a case where the camera 10 is a PTZ camera), the position of the object may be represented by a combination of the coordinate of the object on the video frame 14 and parameter values (a pan angle, a tilt angle, a zoom ratio, and the like) of the camera 10 when the video frame 14 is generated.

As the coordinate space common to all the cameras 10, for example, a coordinate space of a world coordinate such as a global positioning system (GPS) coordinate may be used. In this case, the object tracking apparatus 2000 converts the coordinate of the object in the coordinate space of the camera 10 into a world coordinate. Note that, as a technique of converting the coordinate in the coordinate space of the camera into the world coordinate, an existing technique may be used.

Tracking of Object: S104 and S112

The tracking processing unit 2020 performs tracking processing of the object to be tracked (S104 and S112). The tracking processing means processing of continuously determining the position of the object from the video data 12. More specifically, by detecting the same object from each of a plurality of video frames 14, the tracking processing of the object can be realized by determining the position of the same object in the plurality of video frames 14 (determining a time-series change in the position of the object). Note that the tracking processing unit 2020 performs tracking of the object to be tracked in not only one piece of video data 12 but also pieces of video data 12 obtained from each of the plurality of cameras 10. Here, as a specific method of detecting the same object in the plurality of video frames 14 and a specific method of realizing the detection in the plurality of pieces of video data 12, existing techniques may be used.

Hereinafter, information on the object obtained by the tracking processing is referred to as tracking information. FIG. 7 is a diagram illustrating tracking information in a table format. The table illustrated in FIG. 7 is referred to as a table 200. The table 200 includes an object identifier 202, a detection time 204, a camera identifier 206, a position 208, a first object flag 210, and an associated object identifier 212. The position 208 indicates a position of the object to which the object identifier 202 is assigned in the video frame 14 generated at the detection time 204 by the camera 10 determined by the camera identifier 206.

The first object flag 210 is a flag indicating that the object is handled as the first object 20. The associated object identifier 212 indicates an identifier of an object associated with the object. For example, in a case of performing tracking of the second object 30 in association with the first object 20, the identifier of the first object 20 is set as the associated object identifier 212 in the tracking information of the second object 30.

Note that the object to be tracked by the object tracking apparatus 2000 is not limited to the object handled as the first object 20. For example, the object tracking apparatus 2000 may perform tracking processing for all objects detected from the video data 12.

Method of Determining Object to be Handled as First Object 20

In the object tracking apparatus 2000 according to the present example embodiment, at least one of objects detected from the video data 12 is handled as the first object 20. Hereinafter, a method of determining an object to be treated as the first object 20 will be described.

For example, information on an object to be handled as the first object 20 is predetermined, and is stored in a storage device which allows access from the object tracking apparatus 2000. Hereinafter, the information is referred to as target specifying information.

The target specifying information indicates, for example, an image feature (a feature value on the image) of an object to be handled as the first object 20. For example, when an image feature such as a face of a specific person (such as a suspect in an incident or a blacklisted person) is indicated by the target specifying information, that person can be tracked as the first object 20. Further, instead of a specific person, the target specifying information may indicate an image feature representing a feature that a person or an object to be tracked is likely to have. For example, in a case where it is desired to track a suspicious person as the first object 20, an image feature of a physical feature such as tattoos, an image feature of a wearing item such as sunglasses or a mask, and an image feature of personal belongings such as an attache case may be used.

The object tracking apparatus 2000 determines whether an object detected from the video data 12 has an image feature similar to the image feature indicated by the target specifying information. When detecting an object having an image feature similar to the image feature indicated by the target specifying information, the detection unit 2040 handles the object as the first object 20. Note that, for the object handled as the first object 20, a value (for example, 1) indicating that the object is handled as the first object 20 is set in the first object flag of the tracking information.

In addition, for example, the target specifying information may indicate a type and a feature of an object to be handled as the first object 20. For example, "person" is predetermined as the type of the object to be handled as the first object 20. Further, as the feature of the object to be handled as the first object 20, a physical feature, a wearing item, personal belongings, a behavioral feature (such as wandering and staying), and the like are predetermined. The object tracking apparatus 2000 determines whether or not the object detected from the video data 12 corresponds to an object of the type indicated by the target specifying information and has a feature indicated by the target specifying information. When the object tracking apparatus 2000 determines that the type of the object detected from the video data 12 corresponds to the type indicated by the target specifying information, and that the object has the feature indicated by the target specifying information, the object is handled as the first object 20.

Note that, as a technique of determining whether or not the object detected from the image corresponds to a predetermined type, whether or not the object is wearing a predetermined item, whether or not the object is carrying predetermined belongings, and whether or not the object is performing a predetermined action, an existing technique may be used.

In addition, for example, the object to be handled as the first object 20 may be specified by a user input. For example, the object tracking apparatus 2000 displays the video data 12 on a display device, and receives a user input for selecting an object to be handled as the first object 20 among objects displayed on the display device.

Figure 8:
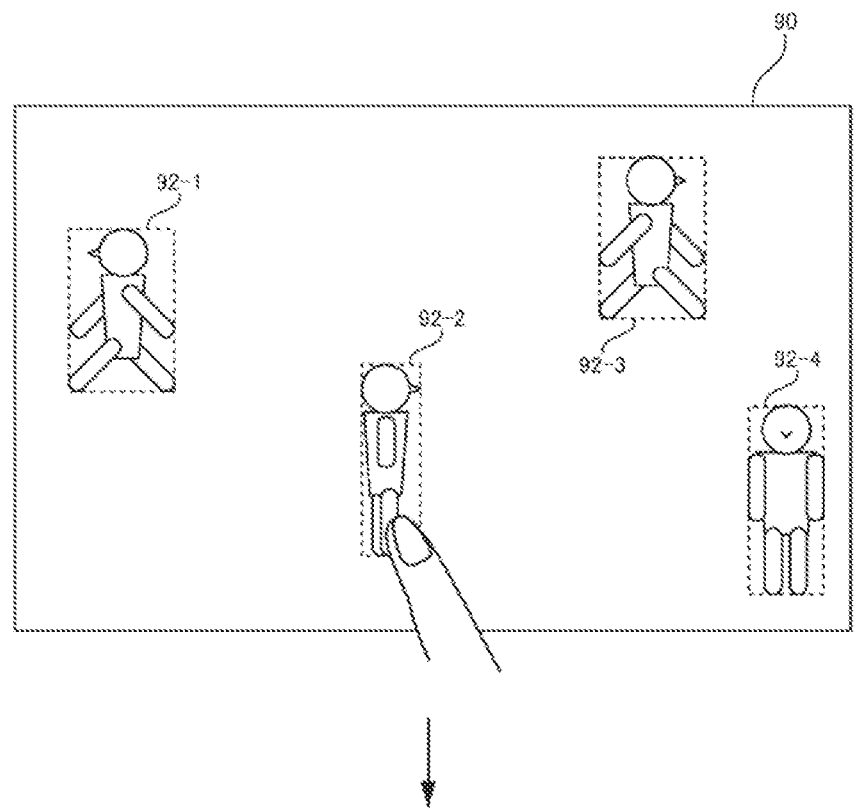
FIG. 8 is a diagram illustrating a case where selection of a first object is received from a user.

FIG. 8 is a diagram illustrating a case where selection of the first object 20 is received from a user. In FIG. 8, the video data 12 is displayed on a touch panel display 90. A circumscribed rectangle 92 is displayed for each object detected from the video data 12. The user touches and selects the circumscribed rectangle 92 of the object to be tracked as the first object 20. The object tracking apparatus 2000 detects the selection operation, and handles the object corresponding to the selected circumscribed rectangle 92 as the first object 20.

Detecting that Predetermined Condition is Satisfied: S106

The detection unit 2040 detects that a predetermined condition is satisfied for the first object 20 and the second object 30 (S106). As described above, the predetermined condition is a condition that is satisfied in a case where the first object 20 enters into the second object 30 or in a case where the first object 20 rides on the second object 30. Detecting that the predetermined condition is satisfied can be realized by, for example, 1) detecting that the first object 20 and the second object 30 overlap each other, and 2) detecting that the first object 20 is not separated from the second object 30 and the first object 20 is no longer detected from the video data 12. Therefore, the detection unit 2040 detects that the predetermined condition is satisfied by, for example, processing as follows.

Figure 9:
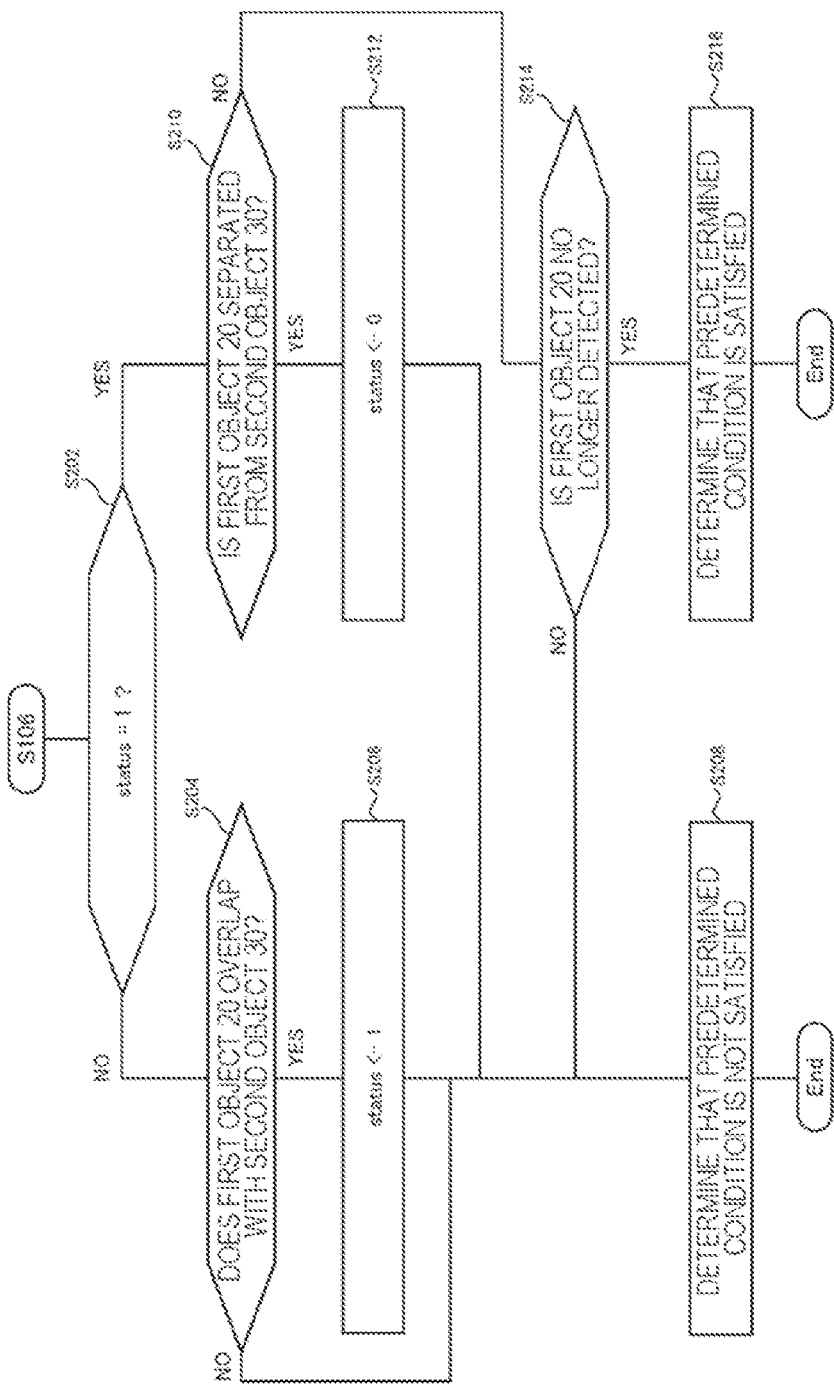
FIG. 9 is a flowchart illustrating a flow of processing of detecting that a predetermined condition is satisfied for a first object 20 and a second object 30.

FIG. 9 is a flowchart illustrating a flow of processing of detecting that the predetermined condition is satisfied for the first object 20 and the second object 30. That is, a series of processing illustrated in the flowchart of FIG. 9 is an example of detailed processing of S106 of FIG. 6. Note that status is a variable that indicates 1 in a case where it is determined that the first object 20 overlaps the second object 30 and indicates 0 otherwise. Therefore, it is assumed that an initial value of status is 0.

The detection unit 2040 determines whether or not the value of status is 1 (S202). In a case where the value of status is 0 (NO in S202), the detection unit 2040 determines whether or not the first object 20 overlaps the second object 30 (S204). In a case where the first object 20 overlaps the second object 30 (YES in S204), the detection unit 2040 sets 1 as the value of status (S206), and then determines that the predetermined condition is not satisfied (S208). On the other hand, in a case where the first object 20 does not overlap the second object 30 (NO in S204), the detection unit 2040 determines that the predetermined condition is not satisfied without changing the value of status (S208).

In S202, in a case where the value of status is 1 (YES in S202), the detection unit 2040 determines whether or not the first object 20 is separated from the second object 30 (S210). In a case where the first object 20 is separated from the second object 30 (YES in S210), the detection unit 2040 returns the value of status to 0 (S212). The detection unit 2040 determines that the predetermined condition is not satisfied (S208).

In S210, in a case where it is determined that the first object 20 is not separated from the second object 30 (NO in S210), the detection unit 2040 determines whether or not the first object 20 is no longer detected (S214). In a case where it is determined that the first object 20 is no longer detected (YES in S214), the detection unit 2040 determines that the predetermined condition is satisfied (S216). In a case where it is not determined that the first object 20 is no longer detected (NO in S214), the detection unit 2040 determines that the predetermined condition is not satisfied (S208).

Determining Whether or not First Object 20 Overlaps Second Object 30: S204

The detection unit 2040 determines whether or not the first object 20 overlaps the second object 30 (S204). For example, in a case where an image region representing the first object 20 overlaps at least a part of an image region representing the second object 30, the detection unit 2040 determines that the first object 20 overlaps the second object 30.

In addition, for example, in a case where the first object 20 and the second object 30 come into contact with each other and then a part of any one of the first object 20 and the second object 30 changes in the video data 12, the detection unit 2040 may determine that the first object 20 overlaps the second object 30. For example, when the first object 20 and the second object 30 overlap each other, it is assumed that the first object 20 is located in front of the second object 30 when viewed from the camera 10. In this case, first, the first object 20 and the second object 30 come into contact with each other before the first object 20 and the second object 30 overlap each other. Thereafter, a part of the second object 30 is hidden by the first object 20, and thus a part of the second object 30 changes on the video data 12. As described above, by detecting a contact between the first object 20 and the second object 30 and a change of a part of the second object 30, the detection unit 2040 can detect that the first object 20 is overlapped at the front of the second object 30.

Determining Whether or not First Object 20 is Separated from Second Object 30: S210

The detection unit 2040 determines whether or not the first object 20 is separated from the second object 30 (S210). For example, the detection unit 2040 determines whether or not there is an overlap between an image region representing the first object 20 and an image region representing the second object 30, by using each video frame 14 generated after it is determined that there is an overlap between the first object 20 and the second object 30. When it is determined that there is no overlap between the image regions, the detection unit 2040 determines that the first object 20 and the second object 30 are separated from each other. On the other hand, when it is determined that there is an overlap between the image regions, the detection unit 2040 determines that the first object 20 and the second object 30 are not separated from each other.

Determining Whether or not First Object 20 is no Longer Detected: S214

The detection unit 2040 determines whether or not the first object 20 is no longer detected from the video data 12. For example, when the first object 20 is no longer detected from the video frame 14 generated after it is determined that the first object 20 overlaps the second object 30, the detection unit 2040 determines that the first object 20 is no longer detected from the video data 12.

Here, it is also considered that the first object 20 is temporarily no longer detected from the video frame 14 due to noise or the like. Therefore, for example, in a case where the first object 20 is not detected from any of a predetermined number or more video frames 14 that are continuous in time series, the detection unit 2040 may determine that the first object 20 is no longer detected from the video data 12.

Note that, in a case where the first object 20 and the second object 30 overlap each other and the first object 20 is located behind the second object 30, the first object 20 is hidden by the second object 30 and is not be seen, and as a result, the first object 20 may not be detected from the video data 12. On the other hand, in a case where the first object 20 is located in front of the second object 30, when the first object 20 is no longer detected from the video data 12, it is considered that the first object 20 enters into the second object 30 or the first object 20 rides on the second object 30.

Therefore, after it is determined that the first object 20 overlaps the second object 30 (when status=1), the detection unit 2040 may perform different processing depending on whether the first object 20 is located in front of or behind the second object 30. In a case where the first object 20 is located in front of the second object 30, the detection unit 2040 determines that the predetermined condition is satisfied when the first object 20 is no longer detected from the video data 12.

On the other hand, in a case where the first object 20 is located behind the second object 30, the detection unit 2040 determines whether or not the first object 20 is detected from the video data 12 after the second object 30 moves. When the first object 20 is detected from the video data 12 after the second object 30 moves, the detection unit 2040 determines that the predetermined condition is not satisfied. On the other hand, in a case where the first object 20 is not detected from the video data 12 after the second object 30 moves, the detection unit 2040 determines that the predetermined condition is satisfied.

Note that, in a case where the first object 20 is only hidden behind the second object 30, a time lag may occur between when the second object 30 moves and when the first object 20 is detected. Therefore, for example, the object tracking apparatus 2000 may attempt to detect the first object 20 from the video data 12 for a predetermined time, after determining that the first object 20 is not detected from the video data 12 after the second object 30 moves and setting the second object 30 to be tracked. When the first object 20 is detected from the video data 12 within the predetermined time, the object tracking apparatus 2000 cancels tracking of the second object 30 associated with the first object 20, and restarts detection of the first object 20. The predetermined time is stored in advance in a storage device which allows access from the detection unit 2040.

Limitation of Object to be Handled as Second Object 30

Note that some objects detected from the video data 12 cannot be considered to satisfy the predetermined condition with the first object 20. That is, there is an object that is unlikely to be considered as an object that allows the first object 20 to enter into the object and move in the object or allows the first object 20 to ride on the object and moves on the object. For example, an installed object such as a bronze statue does not correspond to an object that allows a person to enter into or ride on the object and move. Therefore, it is not all of objects other than the first object 20 detected from the video data 12 to be handled as the second object 30, and only an object that satisfies a certain condition may be to be handled as the second object 30. For example, in a case where a person is handled as the first object 20, it is considered that the second object 30 is limited to a vehicle.

In a case where the object to be handled as the second object 30 is limited, for example, information for specifying the object to be handled as the second object 30 is predetermined. For example, the information may be similar information to the target specifying information for specifying the object handled as the first object 20. The detection unit 2040 handles only the object specified by the predetermined information as the second object 30, among the objects other than the first object 20 detected from the video data 12.

Restarting of Tracking of First Object 20

After the tracking processing of the second object 30 associated with the first object 20 is started, the object tracking apparatus 2000 can directly track the first object 20 again. For example, it is a case where the person 40 gets off the car 50 or the train 60 and starts to move in the example of FIG. 4, or a case where the baggage 70 is unloaded from the car 50 or the train 60 and starts to be carried by a person's hand in the example of FIG. 5.

Therefore, the object tracking apparatus 2000 transitions from a state where tracking processing of the second object 30 associated with the first object 20 is executed (a state where the loop processing B is executed) to a state where direct tracking of the first object 20 is performed again (a state where the loop processing A is executed). This processing is realized, for example, as follows.

While executing the tracking processing of the second object 30 associated with the first object 20, the detection unit 2040 determines whether or not the first object 20 is separated from the second object 30 (S114). When it is determined that the first object 20 is separated from the second object 30 (YES in S114), the state of the object tracking apparatus 2000 transitions to a state where direct tracking of the first object 20 is performed (transitions from S114 to S102).

The determining whether or not the first object 20 is separated from the second object 30 is performed, for example, as follows. That is, the detection unit 2040 determines whether or not the first object 20 is detected from the video frame 14, the video frame 14 being a video frame from which the second object 30 is detected. When the first object 20 is detected from the video frame 14, the detection unit 2040 determines that the first object 20 is separated from the second object 30.

Here, even when the first object 20 is detected from the video frame 14 from which the second object 30 is detected, the detection may be temporary. For example, in the example of FIG. 4, when the person 40 rides in the car 50 and moves in the car 50, a face of the person 40 may be temporarily seen by opening a window of the car 50. In this case, it cannot be said that the person 40 is separated from the car 50 (the person 40 gets off the car 50).

Therefore, for example, when the first object 20 is detected from the video frame 14 from which the second object 30 is detected, the detection unit 2040 further analyzes each video frame 14 generated thereafter, and detects whether or not the first object 20 and the second object 30 no longer overlap each other. In a case where the first object 20 and the second object 30 no longer overlap each other, the detection unit 2040 may determine that the first object 20 is separated from the second object 30.

Case Where Object Other Than First Object 20 is Separated From Second Object 30

Here, there is a case where an object other than the first object 20 is separated from the second object 30 associated with the first object 20. For example, in a case where the first object 20 is a person and the second object 30 is a vehicle, a person other than the first object 20 may get off the second object 30. In such a case, the object other than the first object 20 separated from the second object 30 may be an object which should be tracked in association with the first object 20. For example, in a case where a suspect in an incident is being tracked as the first object 20, a person riding in a car with the first object 20 may be an accomplice of the first object 20.

Therefore, when an object other than the first object 20 is separated from the second object 30 associated with the first object 20, the tracking processing unit 2020 may perform tracking of that object in association with the first object 20. Specifically, the tracking processing unit 2020 sets, to the associated object identifier in the tracking information of that object, the identifier of the first object 20. In this way, another object that is considered to be associated with the first object 20 can be tracked in association with the first object 20. Note that detecting whether an object other than the first object 20 is separated from the second object 30 can be realized by detecting the object other than the first object 20 that overlaps the second object 30 and detecting that the object does not overlap the second object 30.

Output of Information Obtained by Tracking

The object tracking apparatus 2000 outputs various information obtained by the tracking of the first object 20 and the second object 30. A functional unit that outputs the information is referred to as an output unit (not illustrated). For example, the output unit generates and outputs information indicating a history of the position of the first object 20 in consideration of a result of the tracking processing of the second object 30 associated with the first object 20. The information is referred to as tracking result information.

The tracking result information includes the tracking information of the second object 30 for a period during which the first object 20 is associated with the second object 30, in addition to the tracking information generated for the first object 20. By using the tracking result information, it is possible to recognize the history of the position of the first object 20 including a period during which the first object 20 cannot be directly tracked.

Further, preferably, the history of the position of the first object 20 represented by the tracking result information is output in a form that is easy to be visually recognized. For example, the output unit plots the history of the position indicated by the tracking result information on a map. In this way, it is possible to easily recognize the history of the position of the first object 20. At this time, the history of the position of the first object 20 and the history of the position of the second object 30 associated with the first object 20 may be plotted in different forms (for example, different colors).

In addition, for example, for the second object 30 associated with the first object 20, the output unit may output an image of the second object 30, an image feature obtained from the image, tracking information of the second object 30, and the like. By using the pieces of information, it is possible to recognize features such as a car used for movement of the first object 20, or recognize the history of the position of the car.

In addition, for example, for an object other than the first object 20 that gets out of the second object 30 associated with the first object 20, the output unit may output an image of the object, an image feature obtained from the image, tracking information of the object, and the like. By using the pieces of information, for another object that is considered to be related to the first object 20 (for example, a person who is presumed to be an accomplice), it is possible to recognize a feature of the object and a history of the position of the object.

Example Embodiment 2

Figure 10:
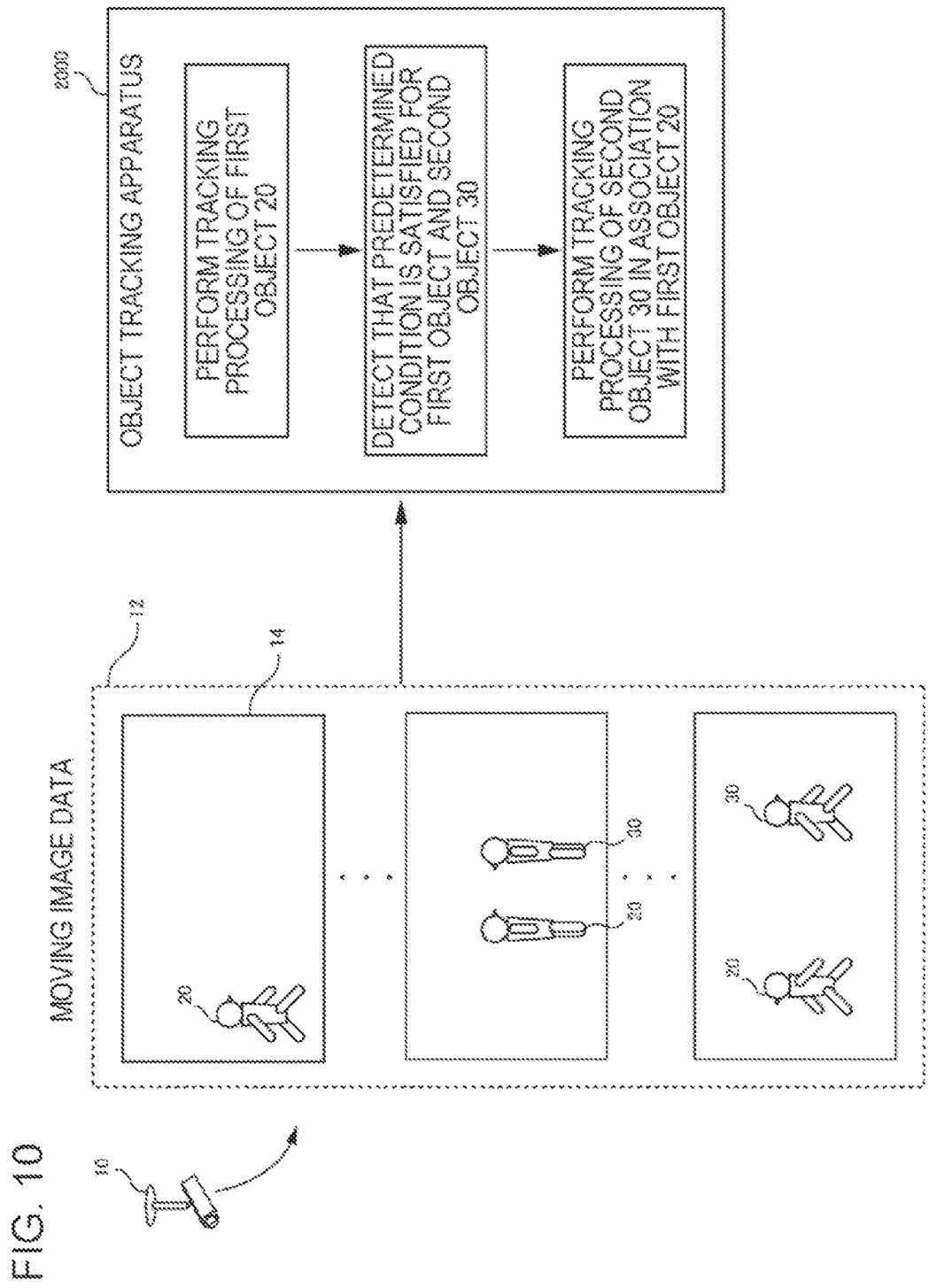
FIG. 10 is a diagram illustrating an object tracking apparatus according to an example embodiment 2.

FIG. 10 is a diagram illustrating an object tracking apparatus 2000 according to an example embodiment 2. FIG. 10 is a diagram illustrating a conceptual description for facilitating understanding of an operation of the object tracking apparatus 2000 according to the example embodiment 2, and does not specifically limit the operation of the object tracking apparatus 2000 according to the example embodiment 2.

The object tracking apparatus 2000 according to the example embodiment 2 is common to the object tracking apparatus 2000 according to the example embodiment 1 in that "performing tracking processing of the second object 30 in association with the first object 20". On the other hand, in the object tracking apparatus 2000 according to the example embodiment 2, a condition for associating the first object 20 and the second object 30 is different from the condition in the object tracking apparatus 2000 according to the example embodiment 1. In the example embodiment 1, it is assumed that direct tracking of the first object 20 is not performed when a predetermined condition is satisfied. Therefore, tracking of the first object 20 is substantially performed by tracking the second object 30. On the other hand, in the example embodiment 2, it is assumed that direct tracking of the first object 20 can be performed even when a predetermined condition is satisfied. Therefore, in the example embodiment 2, when a predetermined condition is satisfied, tracking of the second object 30 associated with the first object 20 is further performed while tracking of the first object 20 is continued.

Representative Advantageous Effect

According to the notification processing apparatus 2000 of the present example embodiment, the second object 30 that satisfies a predetermined condition in relation to the first object 20 is tracked in association with the first object 20. In this way, in addition to the first object 20, an object that is considered to be associated with the first object 20 can be tracked. Therefore, tracking of the object can be realized in a more flexible manner.

For example, it is assumed that a person A who is likely to be a criminal is tracked as the first object 20. At this time, it is assumed that another person B receives baggage from the person A. In this case, the person B may be a person who is conspiring with the person A and committing a crime. Therefore, it is preferable to perform tracking of the person B in addition to the person A. According to the object tracking apparatus 2000 of the present example embodiment, in such a case, the person B considered to be associated with the person A can also be tracked in addition to the person A. Therefore, it is possible to appropriately perform tracking of a person or the like whose necessity of being tracked is not known in advance.

Hereinafter, the object tracking apparatus 2000 according to the example embodiment 2 will be described in more detail.

Example of Functional Configuration

A functional configuration of the object tracking apparatus 2000 according to the example embodiment 2 is similar to the functional configuration of the object tracking apparatus 2000 according to the example embodiment 1 illustrated in FIG. 2. Here, the detection unit 2040 according to the example embodiment 2 detects the second object 30 that satisfies a predetermined condition in relation to the first object 20. When the second object 30 is detected, the tracking processing unit 2020 associates the first object 20 with the second object 30, and performs tracking processing of the second object 30.

Example of Hardware Configuration

A hardware configuration of a computer that realizes the object tracking apparatus 2000 according to the example embodiment 2 is similar to, for example, the hardware configuration of the computer that realizes the object tracking apparatus 2000 according to the example embodiment 1 illustrated in FIG. 3. Here, in the storage device 1080 included in the computer 1000 that realizes the object tracking apparatus 2000 according to the example embodiment 2, a program module that realizes the functions of the functional units included in the object tracking apparatus 2000 according to the example embodiment 2 is stored.

Flow of Processing

Figure 11:
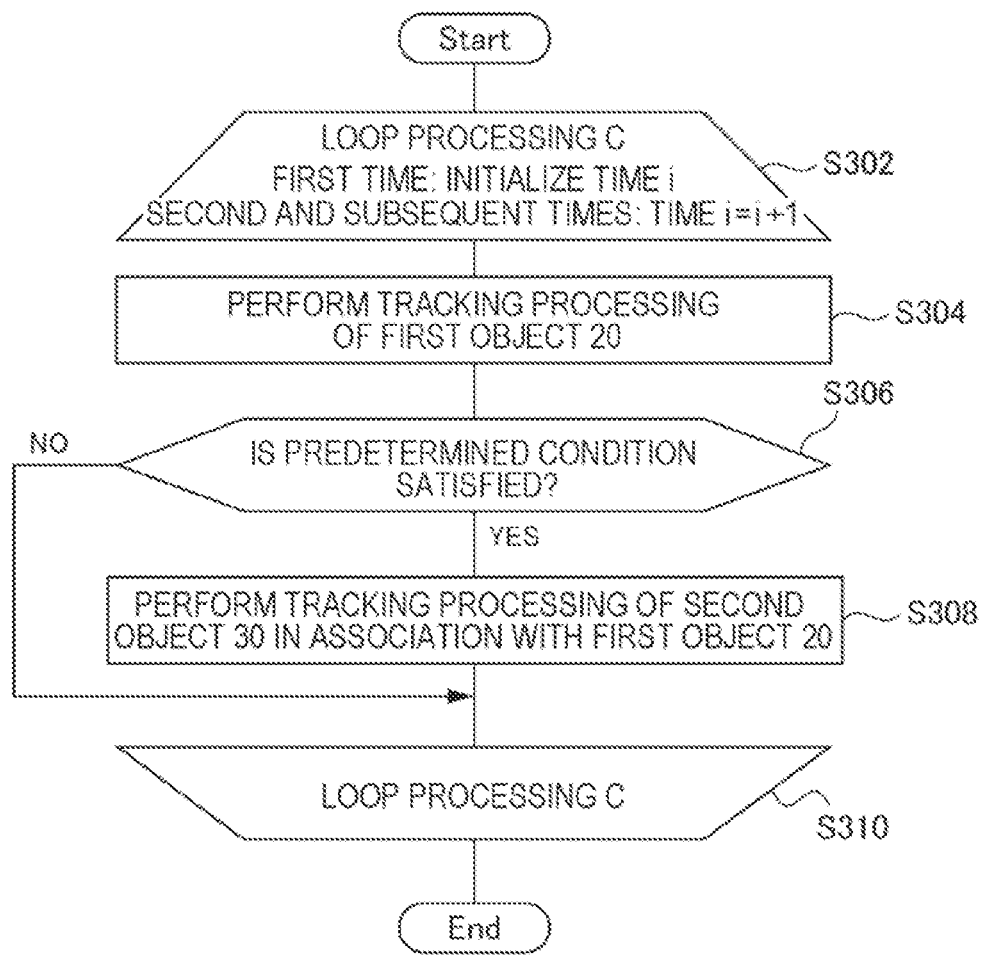
FIG. 11 is a flowchart illustrating a flow of processing executed by the object tracking apparatus according to the example embodiment 2.

FIG. 11 is a flowchart illustrating a flow of processing executed by the object tracking apparatus 2000 according to the example embodiment 2. Steps of S302 to S310 correspond to a loop processing C that is repeatedly executed. In S302 that is executed first, a time i is initialized. For example, at the time of initialization, the time i is set to the current time. In S302 that is executed in second and subsequent times, the time i is increased by one unit (for example, one frame).

The tracking processing unit 2020 performs tracking processing of the first object 20 using each video frame 14 at the time i (S304). The detection unit 2040 determines whether or not the second object 30 satisfies a predetermined condition in relation to the first object 20 (S306). For example, the determination is performed for each of one or more second objects 30 detected from the same video frames 14 as the video frames used for tracking of the first object 20. Further, the determination is performed using the video frames 14 at and before the time i.

In a case where it is determined that the second object 30 satisfies the predetermined condition (YES in S306), the tracking processing unit 2020 executes tracking processing of the second object 30 in association with the first object 20 (S308). On the other hand, in a case where it is determined that the second object 30 does not satisfy the predetermined condition (NO in S306), the processing of FIG. 11 proceeds to S310.

S310 is the end of the loop processing C. Therefore, the processing of FIG. 11 proceeds to S302.

Note that triggers for starting and ending a series of processing illustrated in FIG. 11 are the same as the triggers for starting and ending the series of processing illustrated in FIG. 6.

Further, the second object 30, which is once determined to satisfy the predetermined condition in relation to the first object 20, is excluded from the determination target in S306, and in parallel with the processing of the flowchart illustrated in FIG. 11, tracking processing of the second object 30 may be executed. In this way, it is possible to speed up the processing.

Predetermined Condition

The tracking processing unit 2020 tracks the second object 30 in association with the first object 20, the second object 30 satisfying a predetermined condition in relation to the first object 20 (S308). For this reason, the detection unit 2040 detects the second object 30 that satisfies the predetermined condition in relation to the first object 20 (S306). As the predetermined condition, various conditions may be adopted.

For example, it is assumed that each of the first object 20 and the second object 30 is a person. In this case, a condition such as "the first object 20 and the second object 30 are together for a predetermined time or more", "the first object 20 and the second object 30 have a conversation", "the second object 30 receives an object from the first object 20", or "the second object 30 passes an object to the first object 20" may be adopted. For example, when two persons located within a predetermined distance are detected for a predetermined time or longer from the video data 12, the object tracking apparatus 2000 determines that these persons are together for a predetermined time or longer. Further, for example, when two persons located within a predetermined distance and facing each other are detected for a predetermined time or more from the video data 12, the object tracking apparatus 2000 can determine that these persons have a conversation. Further, the object tracking apparatus 2000 can detect that an object is passed from a first person to a second person by, for example, detecting the first person, an object held by the first person, and the second person, and further detecting that a state of the object is changed from a state of being possessed by the first person to a state of being possessed by the second person, from the video data 12.

In addition, for example, it is assumed that the first object 20 is a person and the second object 30 is an object. In this case, for example, as the predetermined condition, a condition "being left behind by the first object 20" may be adopted. In this way, a fact that the object is left behind by the first object 20 is recognized, and then how the object left behind by the first object 20 is moved thereafter can be tracked. For example, after a specific person and an object held by the person are detected from the video data 12, when the object is separated from the person and the person is no longer detected from the video data 12, the object tracking apparatus 2000 can determine that the object is left behind by the person.

In addition, for example, it is assumed that the first object 20 is an object and the second object 30 is a person. In this case, for example, a condition "the second object 30 carries the first object 20" may be adopted as the predetermined condition. In this way, it is possible to recognize a person who touches an important object whose position is to be tracked or takes away the object, in association with that object. For example, in a case of tracking valuables carried in a case, if a person takes away the contents of the case and the case is discarded, the valuables cannot be tracked thereafter. Therefore, by tracking the person who takes the case in association with the case, it is possible to track the person who is considered to take away the valuables even when the case is discarded. For example, when the object tracking apparatus 2000 detects a specific object from the video data 12 and detects that the object is taken away by a person, the object tracking apparatus 2000 determines that a predetermined condition is satisfied.

Note that the object tracking apparatus 2000 may further track another object satisfying a predetermined condition with the second object 30 by handling the second object 30 that is tracked in association with the first object 20, in the same manner as the first object 20. Suppose that, an object X (second object 30) is left behind by the person A (first object 20), and another person B carries the object X. At this time, if the object X is handled as the first object 20, a predetermined condition "the second object 30 carries the first object 20" is satisfied between the object X and the person B. Therefore, the object tracking apparatus 2000 tracks the person B in association with the object X. In this way, objects that are likely to be related can be linked in a chained manner, and thus it is possible to track the objects.

Output of Information Obtained by Tracking

The output unit of the object tracking apparatus 2000 according to the example embodiment 2 outputs various information obtained by tracking of the first object 20 and the second object 30. For example, the output unit outputs tracking information of the second object 30 that is tracked in association with the first object 20. In this way, it is possible to recognize the history of the position of an object (a person or an object) having a relationship with the first object 20. For example, in a case where a suspect of a case is tracked as the first object 20, tracking of the second object 30 associated with the first object 20 is performed, and thus it is possible to recognize the whereabouts of the object carried by the accomplice or the suspect.

As described above, although example embodiments of the present invention are described with reference to the drawings, these are the illustrations of this invention, various configurations other than the above may also be adopted.

A part or all of the example embodiments may be described as in the following appendix, but are not limited thereto.

1. An object tracking apparatus comprising:
a tracking processing unit that performs tracking processing of an object detected from video data; and
a detection unit that detects, using the video data, that a predetermined condition is satisfied for a first object and another second object, for each of which tracking processing is performed by the tracking processing unit,
wherein the tracking processing unit performs tracking processing of the second object in association with the first object when it is detected that the predetermined condition is satisfied.

2. The object tracking apparatus according to 1,
wherein the predetermined condition is a condition that is satisfied in a case where the first object enters into the second object or in a case where the first object rides on the second object.

3. The object tracking apparatus according to 2,
wherein the predetermined condition is a condition that the first object and the second object overlap each other and then the first object is not detected from the video data without being separated from the second object.

4. The object tracking apparatus according to 2 or 3,
wherein the detection unit detects that the first object is separated from the second object using the video data including the second object on which tracking processing is performed in association with the first object, and
wherein the tracking processing unit performs tracking processing of the first object separated from the second object.

5. The object tracking apparatus according to 4,
wherein the detection unit detects that the first object is separated from the second object, by detecting the first object from the video data including the second object on which tracking processing is performed in association with the first object and detecting that the first object and the second object do not overlap each other.

6. The object tracking apparatus according to 1,
wherein each of the first object and the second object is a person, and
wherein the predetermined condition includes one or more of a condition that the first object and the second object are together for a predetermined time or longer, a condition that the first object and the second object have a conversation, a condition that the second object receives an object from the first object, and a condition that the second object passes an object to the first object.

7. The object tracking apparatus according to 1,
wherein the first object is a person,
wherein the second object is an object, and
wherein the predetermined condition is a condition that the second object is left behind by the first object.

8. The object tracking apparatus according to 1,
wherein the first object is an object,
wherein the second object is a person, and
wherein the predetermined condition is a condition that the second object carries the first object.

9. The object tracking apparatus according to any one of 1 to 8, further comprising:
an output unit that outputs one or more pieces of information including a history of a position of the second object associated with the first object and information representing a feature of the second object.

10. A control method executed by a computer, the method comprising:
a tracking processing step of performing tracking processing of an object detected from video data; and
a detection step of detecting, using the video data, that a predetermined condition is satisfied for a first object and another second object, for each of which tracking processing is performed by the tracking processing step,
wherein, in the tracking processing step, tracking processing of the second object is performed in association with the first object when it is detected that the predetermined condition is satisfied.

11. The control method according to 10,
wherein the predetermined condition is a condition that is satisfied in a case where the first object enters into the second object or in a case where the first object rides on the second object.

12. The control method according to 11,
wherein the predetermined condition is a condition that the first object and the second object overlap each other and then the first object is not detected from the video data without being separated from the second object.

13. The control method according to 11 or 12,
wherein, in the detection step, separation of the first object from the second object is detected using the video data including the second object on which tracking processing is performed in association with the first object, and
wherein, in the tracking processing step, tracking processing of the first object separated from the second object is performed.

14. The control method according to 13,
wherein, in the detection step, that the first object is separated from the second object is detected by detecting the first object from the video data including the second object on which tracking processing is performed in association with the first object and detecting that the first object and the second object do not overlap each other.

15. The control method according to 10,
wherein each of the first object and the second object is a person, and
wherein the predetermined condition includes one or more of a condition that the first object and the second object are together for a predetermined time or longer, a condition that the first object and the second object have a conversation, a condition that the second object receives an object from the first object, and a condition that the second object passes an object to the first object.

16. The control method according to 10,
wherein the first object is a person,
wherein the second object is an object, and
wherein the predetermined condition is a condition that the second object is left behind by the first object.

17. The control method according to 10,
wherein the first object is an object,
wherein the second object is a person, and
wherein the predetermined condition is a condition that the second object carries the first object.

18. The control method according to any one of 10 to 17, further comprising:
an output step of outputting one or more pieces of information including a history of a position of the second object associated with the first object and information representing a feature of the second object.

19. A program causing a computer to execute the control method according to any one of 10 to 18.

What is claimed is:

1. An object tracking apparatus comprising:
at least one processor;
a memory storing instructions executable by the at least one processor to:
detect a plurality of objects within video data;
display the video data, including the detected plurality of objects, on a touch screen;
display a plurality of rectangles on the touch screen that respectively circumscribe the plurality of objects;
receive, via the touch screen, user input of a selected rectangle, from the displayed plurality of rectangle;
perform tracking processing of a first object within the video data, the first object being the object of the plurality of objects corresponding to the selected rectangle, the first object being a person;
detect that a predetermined condition is satisfied by the first object in relation to a second object within the video data, the second object being a vehicle,
wherein the predetermined condition comprises the first object entering the second object or riding on the second object;
perform tracking processing of the second object in association with the first object upon detecting that the predetermined condition is satisfied, such that the first object is indirectly tracked by directly tracking the second object;
detect that a third object different than the first object exits or get offs the second object, the third object being a person other than the first object; and
perform tracking processing of the third object in association with the first object upon detecting that the third object has exited or gotten off the second object.

2. The object tracking apparatus according to claim 1,
the at least processor is further configured to execute the instructions to output one or more pieces of information including a history of a position of the second object associated with the first object and information representing a feature of the second object.

3. The object tracking apparatus according to claim 1, wherein the at least one processor is further configured to execute the instructions to perform tracking processing of the second object by using a service schedule of the second object when the second object is a vehicle operated based on the service schedule.

4. A control method performed by a computer and comprising:
  detecting a plurality of objects within video data;
  displaying the video data, including the detected plurality of objects, on a touch screen;
  displaying a plurality of rectangles on the touch screen that respectively circumscribe the plurality of objects;
  receiving, via the touch screen, user input of a selected rectangle, from the displayed plurality of rectangle;
  performing tracking processing of a first object within the video data, the first object being the object of the plurality of objects corresponding to the selected rectangle, the first object being a person;
  detecting that a predetermined condition is satisfied by the first object in relation to a second object within the video data, the second object being a vehicle,
    wherein the predetermined condition comprises the first object entering the second object or riding on the second object;
  performing tracking processing of the second object in association with the first object upon detecting that the predetermined condition is satisfied, such that the first object is indirectly tracked by directly tracking the second object;
  detecting that a third object different than the first object exits or get offs the second object, the third object being a person other than the first object; and
  performing tracking processing of the third object in association with the first object upon detecting that the third object has exited or gotten off the second object.

5. The control method according to claim 4, further comprising:
  outputting one or more pieces of information including a history of a position of the second object associated with the first object and information representing a feature of the second object.

6. The control method according to claim 4, wherein performing tracking processing of the second object comprises performing the tracking operation of the second object by using a service schedule of the second object when the second object is a vehicle operated based on the service schedule.

7. A non-transitory computer readable medium storing a program executable by a computer to perform a control method comprising:
  detecting a plurality of objects within video data;
  displaying the video data, including the detected plurality of objects, on a touch screen;
  displaying a plurality of rectangles on the touch screen that respectively circumscribe the plurality of objects;
  receiving, via the touch screen, user input of a selected rectangle, from the displayed plurality of rectangle;
  performing tracking processing of a first object within the video data, the first object being the object of the plurality of objects corresponding to the selected rectangle, the first object being a person;
  detecting that a predetermined condition is satisfied by the first object in relation to a second object within the video data, the second object being a vehicle,
    wherein the predetermined condition comprises the first object entering the second object or riding on the second object;
  performing tracking processing of the second object in association with the first object upon detecting that the predetermined condition is satisfied, such that the first object is indirectly tracked by directly tracking the second object;
  detecting that a third object different than the first object exits or get offs the second object, the third object being a person other than the first object; and
  performing tracking processing of the third object in association with the first object upon detecting that the third object has exited or gotten off the second object.

8. The non-transitory computer readable medium according to claim 7, wherein performing tracking processing of the second object comprises performing the tracking operation of the second object by using a service schedule of the second object when the second object is a vehicle operated based on the service schedule.

\* \* \* \* \*